US 9,548,868 B2

United States Patent
Cox et al.

(10) Patent No.: US 9,548,868 B2
(45) Date of Patent: Jan. 17, 2017

(54) GATHERING PARTICIPANTS FOR MEETINGS

(71) Applicant: International Business Machines Corporation, Armonk, NY (US)

(72) Inventors: Susan M. Cox, Rochester, MN (US); Janani Janakiraman, Austin, TX (US); Fang Lu, Billerica, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 183 days.

(21) Appl. No.: 14/020,746

(22) Filed: Sep. 6, 2013

(65) Prior Publication Data

US 2015/0074189 A1 Mar. 12, 2015

(51) Int. Cl.
G06F 15/16 (2006.01)
H04L 12/18 (2006.01)
G10L 25/48 (2013.01)

(52) U.S. Cl.
CPC .......... *H04L 12/1822* (2013.01); *G10L 25/48* (2013.01); *H04L 12/1818* (2013.01)

(58) Field of Classification Search
CPC .............. H04M 3/568; H04M 2201/41; H04M 2201/40; H04M 3/42221; H04M 2203/5054; H04M 3/569; H04M 2203/5009; H04M 2203/5072; H04M 2203/5081; H04M 2203/6045; H04L 12/1818; H04L 65/403; H04L 12/1822; H04L 12/1827; G10L 17/00; G10L 15/26
See application file for complete search history.

(56) References Cited

U.S. PATENT DOCUMENTS

| | | | | |
|---|---|---|---|---|
| 8,593,501 | B1* | 11/2013 | Kjeldaas | H04N 7/15 348/14.01 |
| 2003/0158900 | A1* | 8/2003 | Santos | H04M 3/567 709/205 |
| 2004/0215463 | A1* | 10/2004 | Aoyama | G10L 15/26 704/270 |
| 2005/0014490 | A1* | 1/2005 | Desai | H04M 3/5307 455/416 |
| 2005/0031110 | A1* | 2/2005 | Haimovich et al. | 379/202.01 |
| 2005/0135583 | A1* | 6/2005 | Kardos | H04M 3/56 379/142.01 |
| 2006/0031291 | A1* | 2/2006 | Beckemeyer | G06Q 10/10 709/204 |
| 2007/0168447 | A1 | 7/2007 | Chen et al. | |

(Continued)

*Primary Examiner* — Tauqir Hussain
*Assistant Examiner* — Kamran Mohammadi
(74) *Attorney, Agent, or Firm* — Marcia L. Doubet

(57) ABSTRACT

Participants for an in-progress meeting are gathered, preferably by broadcast of instant messaging notifications thereto. Information for people who are invited to a scheduled meeting but are not participating when the meeting begins, as well as for one or more additional people who are mentioned by the current participants of the meeting as desired new invitees to the in-progress meeting, is placed on a participant list. A disambiguation process may be used in cases where it is not clear who was intended in the discussion of a new invitee. Responses to the notifications are collected and used to populate a consolidated joining status window, where this joining status window depicts the joining status of persons on the participant list.

19 Claims, 10 Drawing Sheets

(56) References Cited

U.S. PATENT DOCUMENTS

| | | | | |
|---|---|---|---|---|
| 2007/0217579 A1* | 9/2007 | Sobti | ............... | H04M 3/533 |
| | | | | 379/67.1 |
| 2007/0217590 A1* | 9/2007 | Loupia | ............... | H04M 1/57 |
| | | | | 379/202.01 |
| 2008/0016214 A1* | 1/2008 | Galluzzo | ............... | H04L 67/322 |
| | | | | 709/226 |
| 2008/0159510 A1* | 7/2008 | Julien | ............... | H04M 7/0027 |
| | | | | 379/202.01 |
| 2009/0310770 A1* | 12/2009 | Longobardi | ............... | H04M 3/56 |
| | | | | 379/202.01 |
| 2009/0323916 A1* | 12/2009 | O'Sullivan | ............... | H04M 3/56 |
| | | | | 379/202.01 |
| 2010/0106504 A1* | 4/2010 | Agrawal | ............... | H04M 3/56 |
| | | | | 704/246 |
| 2011/0258013 A1 | 10/2011 | Groves | | |
| 2011/0301952 A1* | 12/2011 | Koshinaka | ............... | G10L 15/32 |
| | | | | 704/235 |
| 2013/0254279 A1* | 9/2013 | Bentley | ............... | G06Q 10/1095 |
| | | | | 709/204 |
| 2014/0087704 A1* | 3/2014 | DeCesaris | ............... | H04W 4/12 |
| | | | | 455/416 |
| 2014/0152757 A1* | 6/2014 | Malegaonkar | ............... | H04N 7/147 |
| | | | | 348/14.01 |

\* cited by examiner

FIG. 5

| IM Status | Include | Name/Title/Company |
|---|---|---|
| ■ | ☑ | Name One, Prj Mgr, Comp A |
| ☒ | ☐ | Name Two, Designer, Comp B |
| ☐ | ☑ | Name Three, Marketing, Comp A |
| ■ | ☐ | Name Four, Sales/Mkting, Comp B |
| ■ | ☑ | Robert Smith, Designer, Comp B |

510 (header), 520, 530

[send]  ☑ *Default Msg:* Please join meeting In-progress: Call-in 888-xxx-xxxx Participant Code = 0123456

☐ *Custom Msg:*

Legend: ■ available  ☐ away from computer  ☒ logged off

FIG. 6

| IM Status | Omit | Name/Title/Company |
|---|---|---|
| ■ | ☐ | Name One, Prj Mgr, Comp A |
| ☒ | ☑ | Name Two, Designer, Comp B |
| ☐ | ☐ | Name Three, Marketing, Comp A |
| ■ | ☑ | Name Four, Sales/Mkting, Comp B |
| ■ | ☐ | Robert Smith, Designer, Comp B |

610

[send]  ☑ *Default Msg:* Please join meeting In-progress: Call-in 888-xxx-xxxx Participant Code = 0123456

☐ *Custom Msg:*

Legend: ■ available  ☐ away from computer  ☒ logged off

| IM Status | Omit | Name/Title/Company |
|---|---|---|
| *Mandatory* | | |
| ☒ | ☐ | Robert Smith, Designer, Comp B |
| *Optional/Would Like* | | |
| ■ | ☐ | Name One, Prj Mgr, Comp A |
| ■ | ☐ | Name Three, Marketing, Comp A |

[send]   ☑ *Default Msg:* Please join meeting
In-progress: Call-in 888-xxx-xxxx
Participant Code = 0123456

☐ *Custom Msg:*

Legend: ■ available   ☐ away from computer   ☒ logged off

| IM Status | Omit | Name/Title/Company |
|---|---|---|
| *Mandatory* | | |
| ☒ | ☐ | Robert Smith, Designer, Comp B |
| ■ | ☐ | Name One, Prj Mgr, Comp A |
| *Optional/Would Like* | | |
| ■ | ☐ | Name Three, Marketing, Comp A |

[send]   ☑ *Default Msg:* Please join meeting
In-progress: Call-in 888-xxx-xxxx
Participant Code = 0123456

☐ *Custom Msg:*

Legend: ■ available   ☐ away from computer   ☒ logged off

FIG. 9

| Robert Smith<br>Company B<br>555-xxx-xxxx |
|---|
| From: John Host    Please join meeting in progress: Call-in 888-xxx-xxxx Participant Code = 0123456<br>       ○   Joining<br>       ○   Can't Join<br>       ⊙   Will Join Soon<br>       ○   Will Try to Join Later<br>[send] |

FIG. 10

| Name/Title/Company | Joining | Not Joining | Will Join Soon | Will Try to Join Later | No Response | Not on IM |
|---|---|---|---|---|---|---|
| Name One, Prj Mgr, Comp A | ■ | □ | □ | □ | □ | □ |
| Name Three, Marketing, Comp A | □ | □ | □ | □ | ⊠ | □ |
| Robert Smith, Designer, Comp B | □ | □ | ■ | □ | □ | □ |

Legend: ■ joining    □ undetermined    ⊠ not joining

FIG. 11

| Name One<br>Company A<br>555-xxx-xxxx | |
|---|---|
| John Host | Please join meeting in progress: Call-in 888-xxx-xxxx Participant Code = 0123456 |
| [send] | Oops, lost track of time. Dialing in now!    _1110_ |

FIG. 12

| Name/Title/Company | Joining Status | |
|---|---|---|
| Name One, Prj Mgr, Comp A | ■ | Oops, lost track of time. Dialing in now! |
| Name Three, Marketing, Comp A | ☒ | <no response> |
| Robert Smith, Designer, Comp B | ■ | Last meeting is running over, will be there in 10 |
| Legend: ■ joining    ☐ undetermined    ☒ not joining | | |

FIG. 13

| phrase | map to color |
|---|---|
| dialing in now | green |
| will be there in <time - less than 15 min> | green |
| not joining | red |
| will join later | yellow |

| Name/Title/Company | Joining Status | |
|---|---|---|
| Name One, Prj Mgr, Comp A | ■ | Oops, lost track of time. Dialing in now! |
| Name Three, Marketing, Comp A | ☒ | <no response> |
| Robert Smith, Designer, Comp B | ☐ | Last meeting is running over, will be there in 10 |
| Legend: ■ joining    ☐ undetermined    ☒ not joining | | |

| Update phrase mapping?<br>"will be there in 10" | Current --> Change to |
|---|---|
| | ■     ☐ |
| ☑ | Make change permanent |
| ☐ | Leave default at current state |
| ☐ | Ask later |

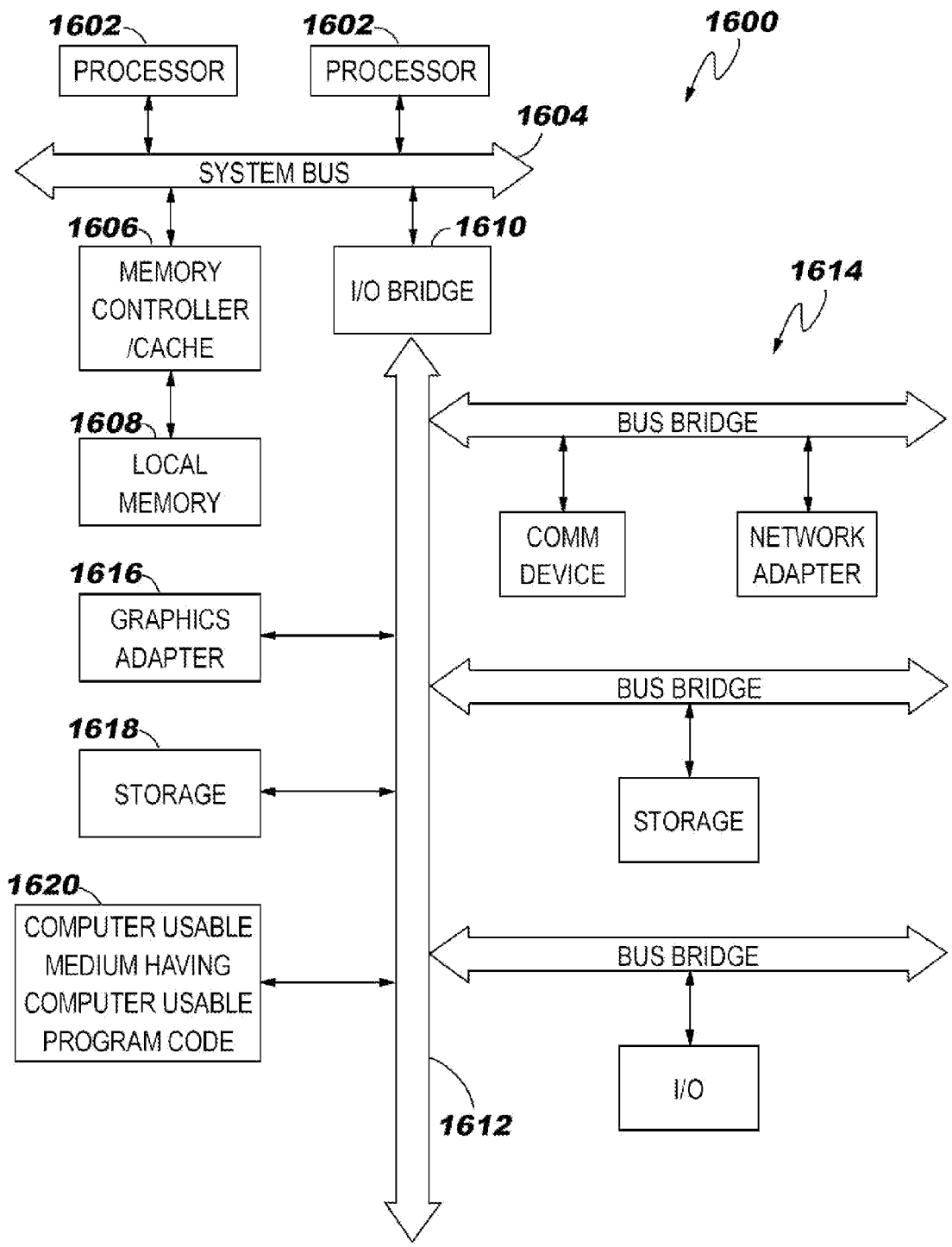

US 9,548,868 B2

GATHERING PARTICIPANTS FOR MEETINGS

BACKGROUND OF THE INVENTION

The present invention relates to computer programming, and deals more particularly with gathering participants for a meeting, preferably using instant messaging ("IM") in combination with real-time parsing of an audio stream.

Many business people have multiple meetings scheduled throughout the day, and some key decision makers may find that their time is double-booked or even triple-booked with scheduled meetings. Some people may have recurring meetings on their calendars, where these meetings have a core set of invitees who are always invited, although it may happen that the set of people who actually need to participate in any given meeting varies depending upon factors such as which problems and issues need attention at that particular meeting. Similarly, a meeting that is not recurring may have a list of invited participants, but dynamic factors may change the list of people whose participation is desired when the meeting actually occurs.

BRIEF SUMMARY OF THE INVENTION

The present invention is directed to gathering participants during an in-progess meeting. In one embodiment, this comprises: a host of the meeting initializing a notification list for a meeting to contain a corresponding entry for each of a plurality of invitees who were originally invited to the meeting; parsing real-time audio of the meeting, until a point in time during the meeting, to determine ones of the invitees who are participating in the meeting; removing the corresponding entry for each of the determined ones from the notification list to thereby cause the notification list to represent each of the originally-invited invitees who is not participating in the meeting; parsing the real-time audio, until the point in time during the meeting, to determine each of at least one additional person who was not one of the plurality of invitees but who is identified in the audio as a new invitee who is not participating in the meeting; adding a corresponding entry to the notification list for each determined new invitee to thereby cause the notification list to represent the each of the originally-invited invitees who is not participating in the meeting and each of the new invitees who is not participating in the meeting; for each of the entries on the notification list subsequent to the removing and the adding, sending a notification to a communication device of the invitee to whom the entry corresponds, the notification inviting the invitee to join the in-progress meeting; receiving, from any responding ones of the communication devices of the invitees to whom the notification was sent, a response to the notification; from each received response, determining a joining status of the invitee from whose communication device the response was received; consolidating, for presentation to the host of the meeting, a report comprising the joining status determined from the each received response; and presenting the consolidated report to the meeting host on a graphical user interface of an electronic device to provide visual identification of the determined joining status for the each of the originally-invited invitees who is not participating in the meeting and the each of the new invitees who is not participating in the meeting.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIGS. 5-6 illustrate alternative views of an IM broadcast window which may be presented to a meeting host, according to an embodiment of the present invention, and FIGS. 7-8 illustrate updates which may be made to this IM broadcast window by the meeting host;

FIG. 9 illustrates a joining status selection window which may be presented to an invited participant, and FIG. 11 illustrates an invited participant's entry of joining status using natural language text input, according to embodiments of the present invention;

FIGS. 10 and 12 illustrate a joining status summary window which may be presented to a meeting host, according to embodiments of the present invention, and correspond respectively to input received from the examples in FIGS. 9 and 11;

FIG. 13 illustrates a mapping which may be used by an embodiment of the present invention to determine a meeting invitee's joining status from parsed natural language text, according to an embodiment of the present invention;

FIGS. 14-15 illustrate a learning process which may be performed by an embodiment of the present invention;

FIG. 16 depicts a data processing system suitable for storing and/or executing program code.

DETAILED DESCRIPTION OF THE INVENTION

Figure 1:
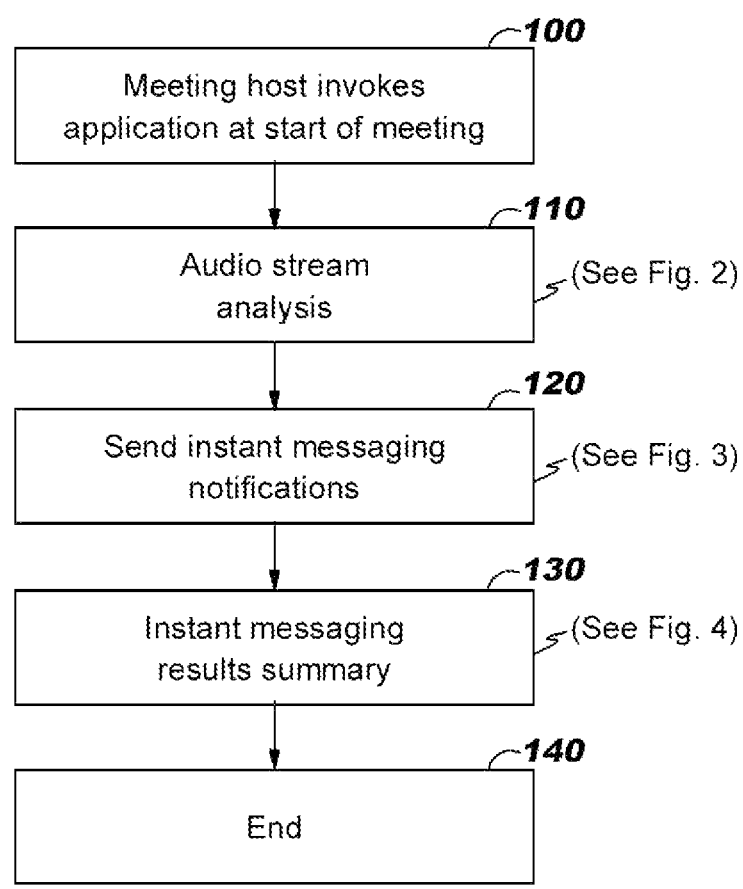
FIGS. 1-4 provide flowcharts depicting logic which may be used when implementing an embodiment of the present invention.

Embodiments of the present invention are directed toward gathering participants for a meeting. The participants are referred to equivalently herein as attendees of the meeting, and the term "invitees" is used to refer to persons who are invited to the meeting—at least some of whom then become participants in the meeting. Use of an embodiment of the present invention may provide useful information and/or added convenience for the meeting host, as will be described.

Meetings may be conducted in many forms, including in-person meetings, meetings conducted over conference calls, and so forth. Embodiments of the present invention are directed primarily to meetings that are conducted with conference call participation, where at least some of the participants are remotely located from other participants. Note that optionally, one or more of the participants may be physically co-located with the meeting host.

When using conventional techniques for inviting participants to a meeting, an invitation list is created for the meeting, where this list identifies the invitees of the meeting. Some of the invitees may be designated on the invitation list as mandatory participants in the meeting, while other invitees may be designated as optional participants. Typically, the invitation list will include the date and time of the meeting, the location of the meeting for those who will attend in person, a call-in conference phone number and password for use by those persons who will participate by conference call, the topics or agenda of the meeting, and the name of each invitee and contact information for sending an invitation to the invitee. By way of non-limiting example, discussions herein refer to using email messages for sending the corresponding invitation to each invitee on the invitation list when using known techniques.

It is observed that often, at least some of the invitees are not present when a meeting begins. Some invitees may have forgotten about the meeting, or they may have overlapping meetings which prevent their attendance, or they may simply be running late, and so forth. If the meeting host is required to contact these not-present invitees to determine whether they are going to join the meeting, it may cause disruption and delay for the meeting as well as for the invitees who are present. Using an embodiment of the present invention, the meeting host may spend less time getting the meeting started, due to improved techniques for gathering ones of these invitees who are able to join the in-progress meeting (as well as new invitees), as will now be described.

An embodiment of the present invention allows the meeting host to determine, in a relatively non-disruptive manner, whether ones of the "invited but not present" invitees will be joining the in-progress meeting, and also enables one or more additional persons—who are referred to herein as "new invitees", meaning people who were not on the original invitation list—to be invited in real-time to join the in-progress meeting. A notification is sent to each of these two types of invitees, and responses to the notifications are collected and presented to the meeting host in a unified window.

Note that two different invitation processes are used, according to an embodiment of the present invention. Conventional techniques such as email messages are preferably used to send a first set of meeting invitations for an upcoming meeting to the invitees on the original meeting invitation list, and then an embodiment of the present invention sends a second set of invitations—which are referred to herein as "notifications" to distinguish from the first set of invitations—for joining an in-progress meeting to the "two types of invitees" which are discussed above.

Preferably, the above-mentioned notifications to join an in-progress meeting are sent using instant messaging. As will be obvious, it is not necessary or useful to send these notifications to those ones of the original invitees who are already participating in the meeting. Accordingly, when the meeting begins, a data structure referred to herein as a "participant list" is created for collecting information about those persons to whom the IM notifications should be sent. In one embodiment, the participant list is initialized to include an entry for each invitee on the original invitation list. A determination is made as to which of the original invitees are actually participating in the in-progress meeting, and the entry for each of those persons is removed from the participant list. The entries on the participant list then represent those invitees who were invited using the original invitation list, but are not currently participating in the meeting. An embodiment of the present invention then determines any additional persons who are mentioned by the actual participants as being someone whose participation is desired, and further updates the participant list by adding an entry thereto for each such new invitee. The participant list then contains the full set of people who are to receive IM notifications that they are requested to join the in-progress meeting.

FIGS. 1-4 provide flowcharts depicting a logic flow which may be used when implementing an embodiment of the present invention. Each of these flowcharts will now be discussed.

FIG. 1 provides a high-level view of an overall process for gathering participants for a meeting. As noted at Block 100, an embodiment of the present invention is invoked by a meeting host at the start of a meeting. As noted earlier, this meeting is referred to herein as an in-progress meeting. Some amount of time may pass before the initial set of participants have joined the meeting, for example due to technical constraints of joining participants into a conference call in sequence. It may be desirable, for example, to allow 30 seconds or perhaps 60 seconds to elapse as an acceptable time for allowing people to join the meeting before an embodiment of the present invention begins operating. This amount of elapsed time may be configurable by the meeting host. As one alternative, a button or other selection means may be provided for the meeting host to activate at a time when the meeting host determines that sufficient time has elapsed and that he/she no longer desires to wait for participants to join the meeting. Following this time period, an analysis of the audio stream of the conference is performed, according to Block 110 of FIG. 1. This audio stream analysis creates the above-discussed participant list, and will now be further described with reference to FIG. 2.

Figure 2:
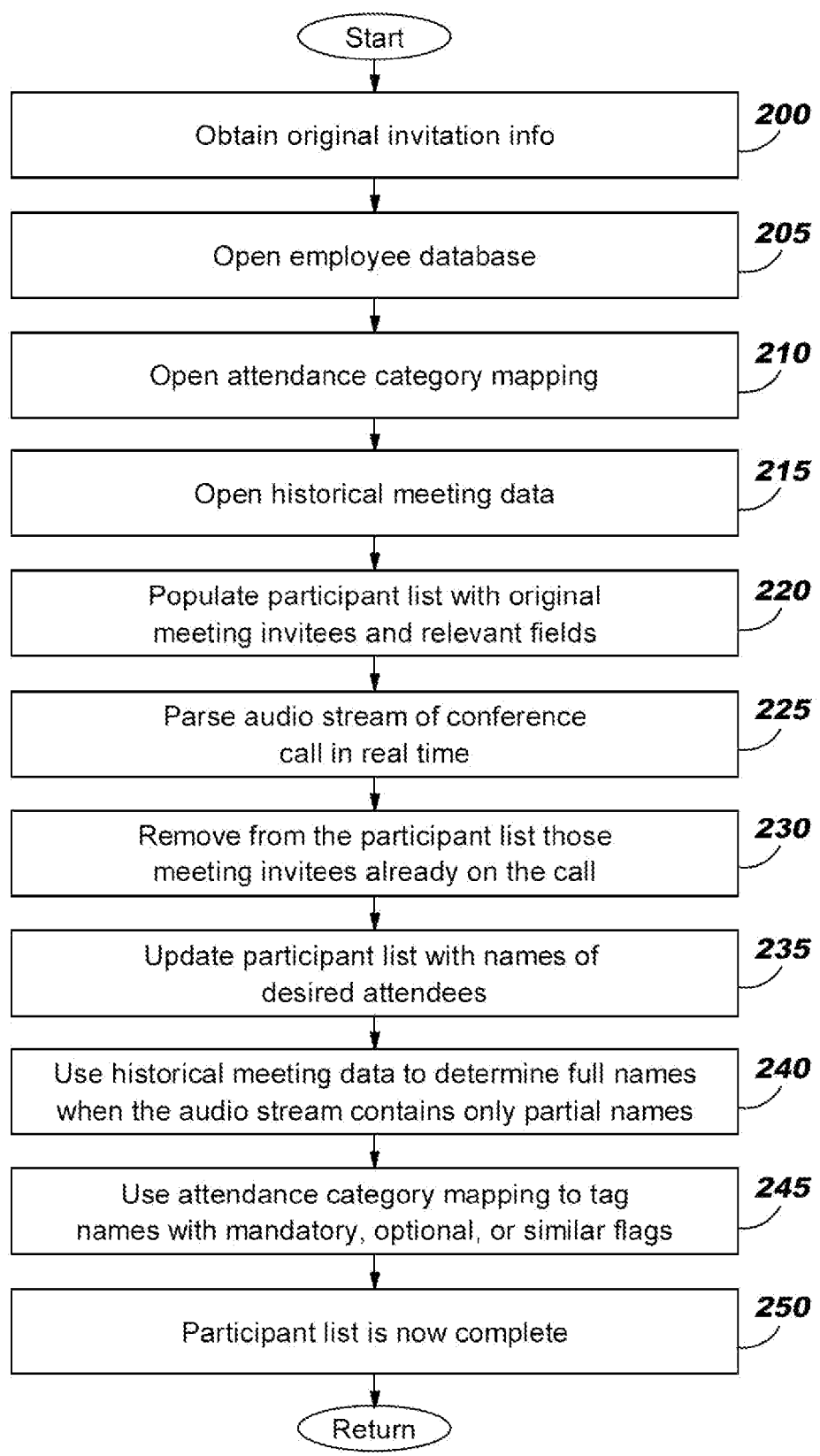
Figure 3:
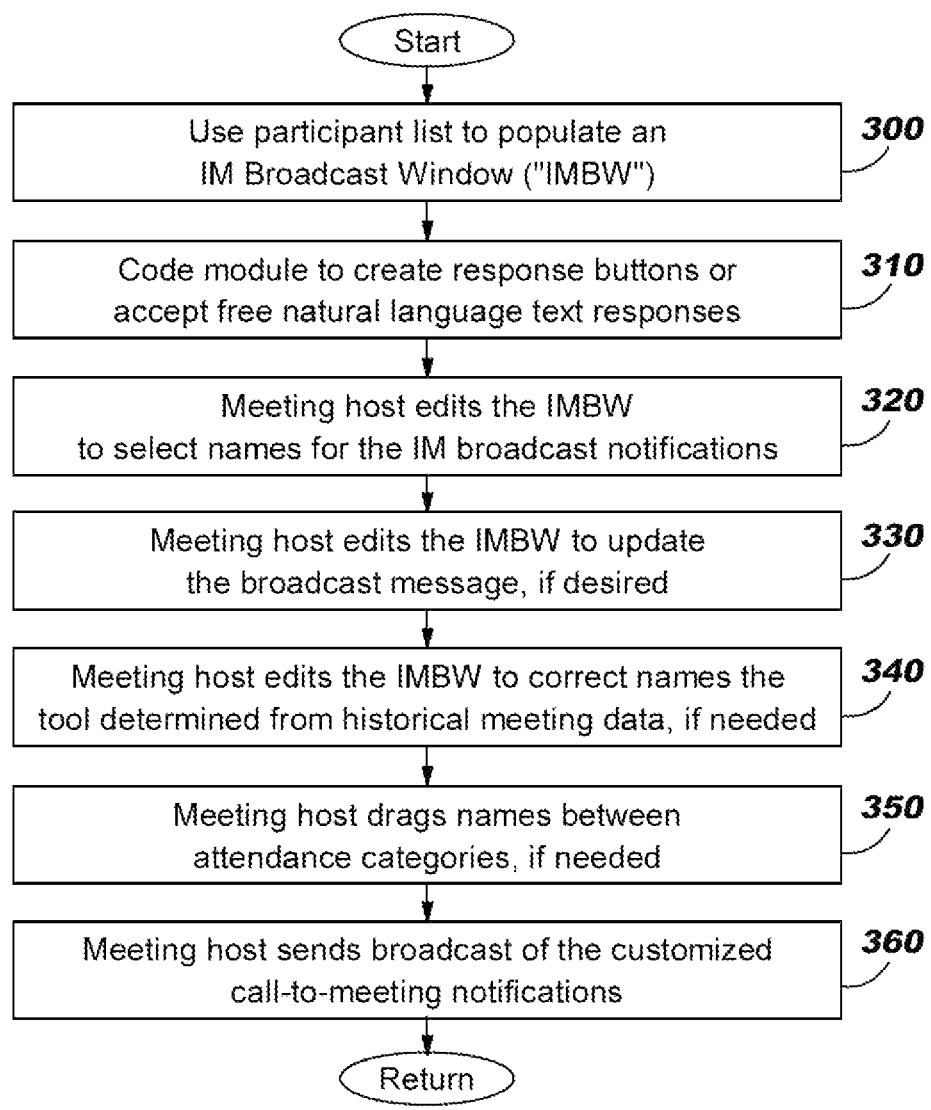

Block 200 of FIG. 2 obtains the original invitation list for the meeting. Typically, meeting invitations are created and stored using electronic calendar applications, and Block 200 may therefore comprise locating the electronic calendar information that corresponds to the in-progress meeting. As was discussed earlier, the electronic calendar information for the meeting will typically include the meeting time and date, topic/agenda, call-in conference phone number and password, and name and contact information for each invitee who is originally invited to the meeting.

Block 205 opens or otherwise locates an employee database or similar data structure in which information about employees is stored. Preferably, this stored information comprises employee name, the time zone of the location in which the employee works, a role and/or title of the employee, and IM contact information (and perhaps current IM status) for the employee. (Note that embodiments of the present invention are not limited to use with participants who are employees of a particular enterprise, and thus references herein to "employee" are to be construed as illustrative but not limiting.)

Block 210 opens or otherwise locates a mapping that associates particular key phrases with corresponding meeting participation categories. The key phrases may be stored as text strings, for example, or perhaps as phonemes for use in comparing against an audio string. The meeting participation categories typically comprise "mandatory", "optional", and so forth. By way of non-limiting example, mappings might associate the text strings "we need", "need", and "needed" with the meeting participation category "mandatory", while another mapping might associate the text string "would be good" with the meeting participation category "optional".

Block 215 opens or otherwise locates a database or similar data structure that stores information about employees' past participation in meetings. Non-limiting examples of the type of information that may be stored include the meeting name, topic(s) discussed at the meeting, participant name in association with meeting(s) attended, frequency of attendance of each participant in the past meetings, and last attendance of the participant in the past meetings. A meeting host using an embodiment of the present invention is optionally allowed to customize information about meeting participation (as will be discussed in further detail below), and the database may therefore contain information about prior customizations that have been performed.

Block 220 populates the above-discussed participant list with an entry containing information pertaining to each of the meeting invitees who are originally invited to the meeting. This information may comprise, by way of non-limiting example, the name, IM status, attendance category (e.g., mandatory or optional), and title/role of each invitee who is listed in the electronic calendar invitation list obtained at Block 200.

Block 225 performs a real-time parsing of the audio stream of the in-progress meeting. This parsing preferably comprises at least one of (1) locating the names or other identification of the persons who are participating in the meeting, and (2) locating the names or other identification of additional persons whose participation is being discussed. Block 230 then removes, from the participant list populated at Block 220, the entry for each of the original invitees who is determined to be already participating in the meeting.

The actual participants in the in-progress may be determined in several ways without deviating from the scope of the present invention. In one approach, the call-in phone numbers may be collected (e.g., using a caller ID system) for the participants who have called in to the conference call, and these call-in phone numbers may be matched against stored information that associates the caller's name with his or her phone number. In another approach, voice recognition of those who are speaking during the in-progress meeting may be used with the results of the real-time parsing performed at Block 225, and stored samples of each invitee's voice may be compared to the parsing results to determine who is present. As another approach, it is noted that participants in conference calls often state their name upon being connected to the conference, such as "Hi, this is Allen. Who else is on the call?", and participant names may be obtained in this manner from results of the real-time parsing performed at Block 225. As yet another approach, the current participants may activate a signal—for example, by pressing a button on a graphical user interface—that indicates their presence, and the participation may be determined by consulting results of these signals.

As a result of the participant list updating performed in Block 230, the entries on the updated participant list now represent the original invitees who are not currently participating in the meeting. Block 235 then adds entries for new invitees to the participant list. These new invitees comprise each additional person whose participation is being discussed by the current meeting participants.

In an embodiment of the present invention, the identification of the additional person or persons is determined by analyzing results (Block 235) of the real-time parsing of the meeting audio stream (from Block 225). This analysis comprises searching the parsed audio stream results for names and contextual information, which preferably comprises predetermined attendance category key phrases, in the audio stream near to the spoken names. As one example, the analysis may comprise searching for predetermined keywords and phrases such as "What about <name>, shouldn't we include <him/her>?" or "I think <name> should be on the call.". From this analysis, the <name> information—and optional surrounding context—is used by an embodiment of the present invention to consult a data structure comprising mappings between names and IM contact details, and information for the persons who are identified is then added to the participant list.

For example, if a participant Allen states "We really need to have Bob in this call to discuss the status of the action items.", then the processing at Block 235 corresponds to locating the spoken name "Bob" and the key phrase "need to have", and then adding an entry for Bob to the participant list.

It should be noted that while Blocks 225-235 are shown as proceeding sequentially, this is by way of drafting convenience and is not by way of limitation. An embodiment of the present invention preferably performs this processing in an iterative manner, which will allow for late-arriving ones of the original meeting participants to be removed from the participant list (Block 230) during the time when additional participants are being added to the participant list as new invitees due to being discussed by other already-present participants (Block 235). The real-time parsing (Block 225) and the corresponding updating of the participant list (Blocks 230-235) preferably continue for a limited amount of time, which may be configurable by the meeting host or which may (as one alternative) be set by a systems administrator. As another alternative, a button or other selection means may be provided for the meeting host to activate at a time when the meeting host determines that sufficient time has elapsed and that he/she no longer desires to wait for new invitees to be mentioned by participants in the in-progress meeting For each of the new invitees added to the participant list at Block 235, Blocks 240-245 augment the corresponding entry in order to enable contacting each such person with an IM notification of the in-progress meeting. Often, the discussion of additional persons which is captured from the audio stream will be of a casual nature, where the persons are mentioned only by first name or perhaps by a nickname, and this is referred to in Block 240 as a "partial" name. The database or other structure which was discussed above with reference to Block 215 is preferably consulted at Block 240 to disambiguate these partial names. It may happen that a person's first name is mentioned during the audio stream, and that only one person having this first name has corresponding information stored in the data structure referenced above (see Block 205). The processing of Block 240 may then comprise simply locating that entry in the data structure, and augmenting the person's information to the corresponding entry in the participant list (e.g. by adding the person's IM contact and status information). On the other hand, it may be necessary to select from among multiple potential candidates to disambiguate the partial name. With reference to the above-described example, where "Bob" is mentioned by Allen in the audio stream of the meeting, it may happen that the enterprise employs "Robert Smith" and "Robert Jones". The processing at Block 240 preferably comprises, in this example, determining that "Bob" is a nickname for "Robert", and using the historical meeting data to determine whether Allen was referring to Robert Smith or Robert Jones. This may further comprise comparing keywords from the meeting agenda or topic list of the in-progress meeting to the topic(s) discussed at historical meetings, and determining which of Robert Smith and Robert Jones most recently and/or most often attended meetings which match according to this comparison. A selection is then made as a result of this disambiguation, and Block 240 adds augments the entry in the participant list with corresponding information for either Robert Smith or Robert Jones.

In one embodiment, Block 245 further updates the information on the participant list for each of the additional invitees to include a meeting attendance category. The attendance category mapping discussed above with reference to Block 210 is preferably used for this updating. In the example discussed above with reference to "We really need to have Bob . . . ", the processing of Block 245 comprises searching the mapping for "need to have" (or perhaps for "need to" or "need"); determining that such key phrase is mapped to the "mandatory" attendance category; and then updating the entry for either Robert Jones or Robert Smith (as determined by Block 240) to include a "mandatory" setting.

Block 250 notes that the participant list is now complete, having all pertinent fields populated both for the invitees who were originally invited but are not participating and for the new invitees. (Note also that at this point, the real-time parsing of the audio stream is also complete.) Processing therefore returns to the invoking logic (and thus continues at Block 120 of FIG. 1).

When processing commences at Block 120 of FIG. 1, a notification process is performed for inviting participants to the in-progress meeting using IM communications. This processing will now be further described with reference to FIG. 3.

Block 300 uses the participant list resulting from the processing of FIG. 2 to populate a window which is referred to herein as an "IM broadcast window". Examples of such window are provided in FIGS. 5-6, by way of illustration but not of limitation, and contain an entry for each person who has an entry on the participant list.

Block 310 optionally activates code to create response buttons in the IM notifications for entry of joining status in responses to these notifications, or alternatively to accept natural language joining status responses. In one embodiment, the instant message notification sent to each person will include a graphical button or buttons which can be activated by the receiving user to indicate that user's joining status. Non-limiting examples of joining status text to be displayed on such buttons include "Not available" (or "Not joining"), "Will join", and "Might join". Response messages from persons who reply to the IM notifications are then parsed (as discussed below with reference to FIG. 4) to determine the responding person's joining status according to which button was activated by the receiving user. In another embodiment, the instant message notification sent to each person does not include graphical button(s), and the joining status will therefore be determined by natural-language parsing of the response messages.

In Block 320, the meeting host optionally uses the IM broadcast window to edit the list of names of persons to whom IM notifications will be sent. In one approach, the IM broadcast window contains a checkbox, radio button, or other graphical selection indicator for each entry from the participant list, and the meeting host may then use such indicator to select all or a subset of the participants. See, for example, the checkboxes in column 510 of FIG. 5, which the meeting host may check to indicate that the corresponding person should be included in the broadcast of IM notifications. By contrast, see the checkboxes in column 610 of FIG. 6, which the meeting host may check to indicate that the corresponding person should be omitted from the broadcast of IM notifications.

A default message is preferably constructed for sending in the IM notifications created according to the present invention. This default message may be created, for example, by copying one or more fields of the original meeting invitation. Preferably, the default message includes at least the call-in conference number and password, and may indicate that the meeting is already in progress. See 520 of FIG. 5, where a sample default message is illustrated. In Block 330, the meeting host optionally uses the IM broadcast window to edit this default message. An embodiment of the present invention preferably allow the meeting host to construct a custom message, to be used instead of a default message, and this feature is illustrated by the text entry box (and corresponding checkbox) at 530 of FIG. 5.

The meeting host may determine that the disambiguation processing performed at Block 240 selected, as a new invitee, someone different from the person who was actually intended. Accordingly, Block 340 allows the meeting host to change any of the new invitees on the participant list prior to sending the IM notifications. If Robert Smith was added by Block 240, for example, the meeting host might overtype "Smith" with "Jones" at Block 340. As another option, a drop-down list might be provided of alternative candidates who were located by the processing of Block 240, and the meeting host may then select one of these names at Block 340. When a change is made in Block 340, corresponding information is updated in the participant list, comprising at least the IM contact information for the newly-identified participant.

In one embodiment, a learning process is also invoked at Block 340 to remember the update(s) to the participant list made by the meeting host. This learning process may comprise, by way of example, recording that meeting host John Host changed new invitee Robert Smith to Robert Jones in association with particular meeting topic keywords and/or in association with particular meeting participants. It should be noted that this learning process may be invoked inline, following the other processing of Block 340, or as an alternative, the learning process may be delayed to another time (e.g., following the processing of FIG. 4).

In Block 350, the meeting host optionally uses the IM broadcast window to edit the attendance category of one or more of the participants. For example, if the processing of Block 245 set the attendance category for Robert Smith to "mandatory", the meeting host may decide to override this to use "optional" instead. The editing at Block 350 may comprise dragging entries between sections of the IM broadcast window which correspond to mandatory and optional attendance. See FIGS. 7-8, where this is illustrated. In FIG. 7, the meeting invitee named "Name One" is initially identified as an optional participant. FIG. 8 illustrated this invitee being moved, by the meeting host at Block 350, to become identified as a mandatory participant. Note that if the IM notifications include an invitee-specific designation of attendance category—such as "Bob, your presence is mandatory at the in-progress meeting . . . "—then the processing of Block 350 also preferably comprises updating this designation responsive to the editing by the meeting host.

In one embodiment, a learning process is also invoked at Block 350 to remember the update(s) to the attendance category made by the meeting host. This learning process may comprise, by way of example, recording that meeting host John Host changed new invitee Robert Smith to optional attendance in association with particular meeting topic keywords and/or in association with particular meeting participants. It should be noted that this learning process may be invoked inline, following the other processing of Block 350, or as an alternative, the learning process may be delayed to another time (e.g., following the processing of FIG. 4).

In Block 360, the meeting host activates an indicator such as a graphical "Send" button to broadcast the IM notifications to the participant list. This is referred to in Block 360 as sending customized "call-to-meeting" IM notifications. Processing then returns to the invoking logic (and thus continues at Block 130 of FIG. 1).

When processing commences at Block 130 of FIG. 1, a results summary collection process is performed for determining the joining status of the participants to whom IM notifications were sent at Block 360. This results summary collection processing will now be further described with reference to FIG. 4.

Figure 4:
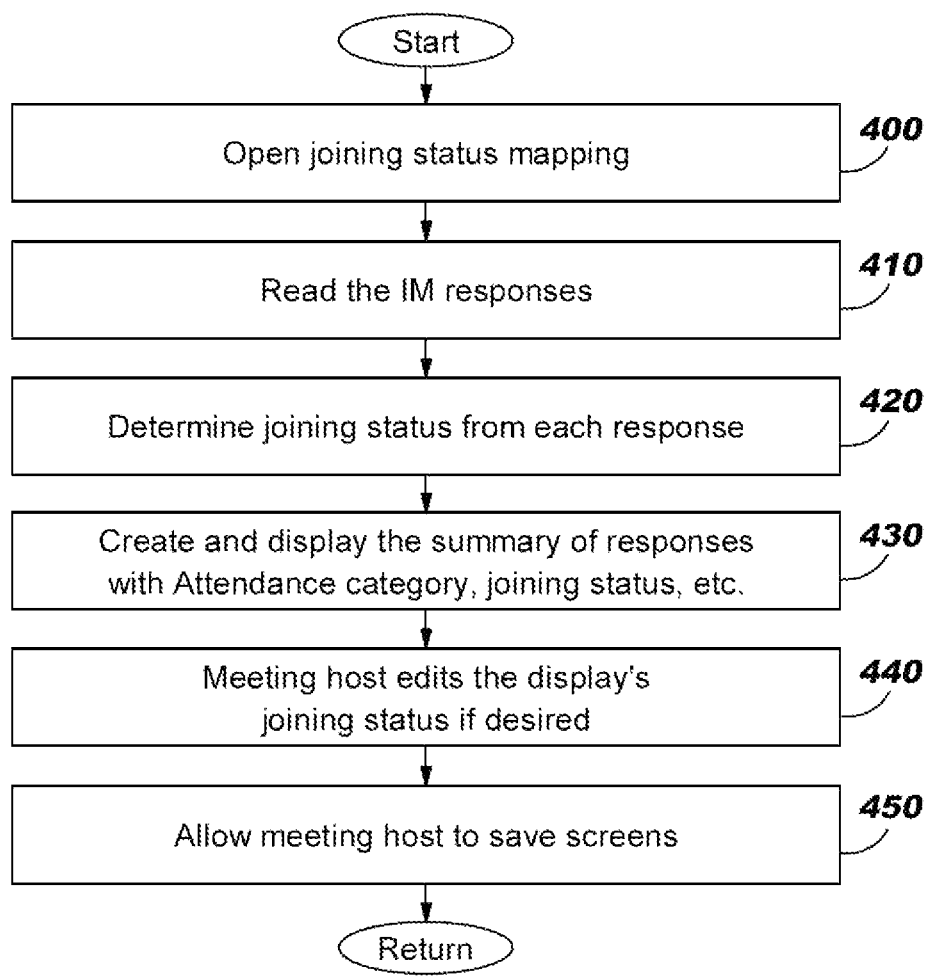

Block 400 of FIG. 4 opens or otherwise accesses a database or similar data structure that maps natural language key phrases to joining status. As illustrative examples, the text "dialing in now" may be mapped to "joining"; the text "can't attend" may be mapped to "not joining"; the text "will call in 10 minutes" may be mapped to "joining soon" or perhaps to "maybe"; and so forth. Notably, some entries in the mapping data structure may contain references to particular time periods. For example, one entry might map "will call in 3 minutes" to "joining soon" while another entry might map "will call in >3 minutes" to "may join", and logic may be invoked to compare a time period from a received response to the time period of such entries (e.g., determining that "will call in 10 minutes" corresponds to the " . . . >3 minutes" entry and not to the " . . . in 3 minutes" entry).

Block 410 collects the responses which are received to the IM notifications broadcast. In an embodiment where a graphical joining status selector was provided in the outbound IM notifications, Block 420 determines the joining status in responses according to the responding user's selection in the response message. See FIG. 9, which illustrates a display that may be presented to an invited participant, and which contains radio buttons from which the responding user may select to indicate his/her joining status. Where such joining status selector has not been provided in the IM notifications (e.g., where Block 310 determined that only natural language responses would be used), Block 420 compares natural language text in the response to the mappings which were discussed with reference to Block 400 to determine the responding user's joining status. See FIG. 11, which illustrates this entry of natural language text for a responding user's joining status at 1110. Note that it may happen that a response is not received from one or more persons to whom an IM invitation is sent. In this case, the joining status for the non-responding users is preferably set to "not joining".

Block 430 creates a window which is referred to herein as a "joining status window" to display a consolidated summary of joining status information for the meeting host. Preferably, this joining status window comprises the name of each responding user, the attendance category which was requested for this user, and the joining status indicated by the responding user.

Illustrative examples of a joining status window are presented in FIGS. 10 and 12, by way of illustration but not of limitation. FIG. 10 illustrates a joining status window that consolidates results from responding users having a joining status selector display such as that in FIG. 9, and FIG. 12 illustrates a joining status window that consolidates results from responding users who provide natural language text responses using a display such as that in FIG. 11. Optionally, a joining status window may be organized by joining status—for example, where all invitees whose joining status is "joining" appear first, and so forth—although this has not been shown in FIG. 10 or 12. As another option, a color-coding scheme may be used for enhancing the visual depiction of joining status in the joining status window. FIG. 13 illustrates a sample mapping between several joining status key phrases and corresponding colors, by way of example.

It will be noted that the processing of Blocks 410-430 may be iterative, as some responses may arrive later than others. A time period in which responses are collected and processed may be configured by the meeting host (or as one alternative, such time period may be set by a systems administrator). While FIG. 4 does not explicitly depict iteratively collecting the responses which are received to the IM broadcast (Block 410), determining the joining status from such response (Block 420), and updating the joining status window (Block 430), one of ordinary skill in the art will readily understand, in view of the disclosure provided herein, how such iteration may be reflected in the depicted logic flow of FIG. 4.

Optionally, the meeting host may edit information in the joining status window, as noted at Block 440. This editing may comprise changing the joining status of one or more entry. For example, the meeting host might change the joining status of "joining in 10 minutes" to "joining" instead of "maybe". This is illustrated in FIGS. 12 and 14, where the meeting host has changed the joining status of the invitee whose name is "Robert Smith" from "joining", as shown in FIG. 12, to "undetermined" as shown in FIG. 14.

In one embodiment, a learning process is also invoked at Block 440 to remember the update(s) to the joining status made by the meeting host. This learning process may comprise, by way of example, recording that meeting host John Host changed the result of mapping "joining in 10 minutes" from "joining" to "maybe", as discussed above with reference to the example in FIGS. 12 and 14. It should be noted that this learning process may be invoked inline, following the other processing of Block 440, or as an alternative, the learning process may be delayed to another time (e.g., following the processing of FIG. 4).

FIG. 15 provides an example of a graphical display which may be used with the learning process discussed above with reference to FIGS. 12 and 14, where the meeting host changes a joining status shown in the joining status window. In this example, the key phrase "will be there in 10", which corresponds to the changed joining status, is shown in the window 1500, and the meeting host is given several options, which include making this change to the mappings permanent; leaving the default mapping at its current state; or deferring the decision until later (as shown by the "Ask later" choice in FIG. 15). A similar graphical display may be used with the learning processes which were discussed above.

Block 450 indicates that an embodiment of the present invention may allow the meeting host to save one or more of the screens which are displayed. For example, the joining status window may be persisted. Saving screens may serve to document the meeting. Following the processing of Block 450, control returns to the invoking logic, and thus proceeds to Block 140 of FIG. 1, where the logic flow of a preferred embodiment then ends.

Referring now to FIG. 16, a block diagram of a data processing system is depicted in accordance with the present invention. Data processing system 1600 may comprise a symmetric multiprocessor ("SMP") system or other configuration including a plurality of processors 1602 connected to system bus 1604. Alternatively, a single processor 1602 may be employed. Also connected to system bus 1604 is memory controller/cache 1606, which provides an interface to local memory 1608. An I/O bridge 1610 is connected to the system bus 1604 and provides an interface to an I/O bus 1612. The I/O bus may be utilized to support one or more buses 1614 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 1616, storage 1618, and a computer usable storage medium 1620 having computer usable program code embodied thereon. The computer usable program code may be executed to execute any aspect of the present invention, as have been described herein.

The data processing system depicted in FIG. 16 may be, for example, an IBM System p® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both. "Java" is a registered trademark of Oracle America, Inc., in the United States, other countries, or both.)

Figure 17:
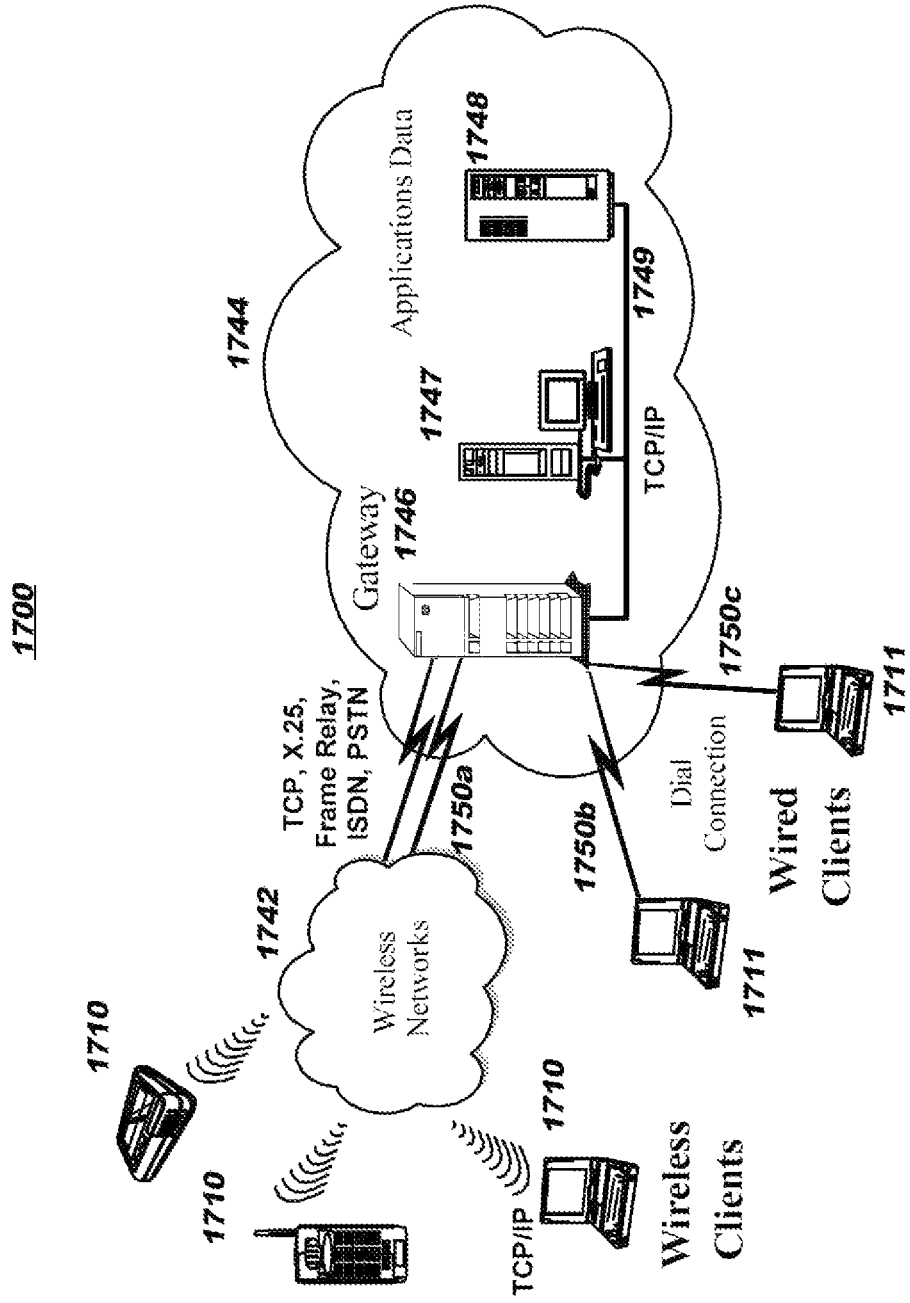
FIG. 17 depicts a representative networking environment in which one or more embodiments of the present invention may be used.

FIG. 17 illustrates a data processing network environment 1700 in which the present invention may be practiced. The data processing network 1700 may include a plurality of individual networks, such as wireless network 1742 and wired network 1744. A plurality of wireless devices 1710 may communicate over wireless network 1742, and a plurality of wired devices, shown in the figure (by way of illustration) as workstations 1711, may communicate over network 1744. Additionally, as those skilled in the art will appreciate, one or more local area networks ("LANs") may be included (not shown), where a LAN may comprise a plurality of devices coupled to a host processor.

Still referring to FIG. 17, the networks 1742 and 1744 may also include mainframe computers or servers, such as a gateway computer 1746 or application server 1747 (which may access a data repository 1748). A gateway computer 1746 serves as a point of entry into each network, such as network 1744. The gateway 1746 may be preferably coupled to another network 1742 by means of a communications link 1750*a*. The gateway 1746 may also be directly coupled to one or more workstations 1711 using a communications link 1750*b*, 1750*c*, and/or may be indirectly coupled to such devices. The gateway computer 1746 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 1746 may also be coupled 1749 to a storage device (such as data repository 1748).

Those skilled in the art will appreciate that the gateway computer 1746 may be located a great geographic distance from the network 1742, and similarly, the workstations 1711 may be located some distance from the networks 1742 and 1744, respectively. For example, the network 1742 may be located in California, while the gateway 1746 may be located in Texas, and one or more of the workstations 1711 may be located in Florida. The workstations 1711 may connect to the wireless network 1742 using a networking protocol such as the Transmission Control Protocol/Internet Protocol ("TCP/IP") over a number of alternative connection media, such as cellular phone, radio frequency networks, satellite networks, etc. The wireless network 1742 preferably connects to the gateway 1746 using a network connection 1750*a* such as TCP or User Datagram Protocol ("UDP") over IP, X.25, Frame Relay, Integrated Services Digital Network ("ISDN"), Public Switched Telephone Network ("PSTN"), etc. The workstations 1711 may connect directly to the gateway 1746 using dial connections 1750*b* or 1750*c*. Further, the wireless network 1742 and network 1744 may connect to one or more other networks (not shown), in an analogous manner to that depicted in FIG. 17.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method for gathering participants during an in-progress meeting, comprising:
    a host of the meeting initializing a notification list for a meeting to contain a corresponding entry for each of a plurality of invitees who were originally invited to the meeting;
    parsing real-time audio of the meeting, until a point in time during the meeting, to determine ones of the invitees who are participating in the meeting;
    removing the corresponding entry for each of the determined ones from the notification list to thereby cause the notification list to represent each of the originally-invited invitees who is not participating in the meeting;
    parsing the real-time audio, until the point in time during the meeting, to determine each of at least one additional person who was not one of the plurality of invitees but who is identified in the audio as a new invitee who is not participating in the meeting;
    adding a corresponding entry to the notification list for each determined new invitee to thereby cause the notification list to represent the each of the originally-invited invitees who is not participating in the meeting and each of the new invitees who is not participating in the meeting;
    for each of the entries on the notification list subsequent to the removing and the adding, sending a notification to a communication device of the invitee to whom the entry corresponds, the notification inviting the invitee to join the in-progress meeting;
    receiving, from any responding ones of the communication devices of the invitees to whom the notification was sent, a response to the notification;
    from each received response, determining a joining status of the invitee from whose communication device the response was received;
    consolidating, for presentation to the host of the meeting, a report comprising the joining status determined from the each received response; and
    presenting the consolidated report to the meeting host on a graphical user interface of an electronic device to provide visual identification of the determined joining status for the each of the originally-invited invitees who is not participating in the meeting and the each of the new invitees who is not participating in the meeting.

2. The method according to claim 1, wherein the meeting is conducted by a conference call.

3. The method according to claim 1, wherein the invitees who are invited to the meeting are invited by electronic mail.

4. The method according to claim 1, wherein each notification is sent by instant messaging.

5. The method according to claim 1, wherein the point in time is selected such that the parsing is performed for a fixed amount of time.

6. The method according to claim 5, wherein the fixed amount of time is configurable.

7. The method according to claim 5, wherein the point in time corresponds to a time at which the meeting host takes an action to cease accepting identification of further ones of the additional persons as the new invitees.

8. The method according to claim 1, wherein determining the joining status of the invitee comprises parsing the response received from the communication device of the invitee to determine therefrom the joining status of the invitee.

9. The method according to claim 8, wherein parsing the response to determine therefrom the joining status further comprises:
   comparing a result of the parsing to a mapping which associates natural language text strings with predetermined joining status classifications until locating a selected one of the predetermined joining status classifications that corresponds to the received response; and
   using the selected one as the joining status determined from the received response.

10. The method according to claim 8, wherein:
   each notification is configured to present the invitee to whose communication device the notification is sent with a selection from a plurality of joining status classifications;
   parsing the response to determine therefrom the joining status further comprises searching a result of the parsing to determine which one of the plurality of joining status classifications was selected by the invitee from whose communication device the response was received; and
   using the selected one as the joining status determined from the received response.

11. The method according to claim 1, wherein parsing the audio to determine each of at least one additional person who is identified in the audio further comprises locating, in the parsed audio, contextual information for determining whether the each additional person is to be a mandatory participant for the meeting.

12. The method according to claim 11, wherein determining whether the each additional person is to be a mandatory participant for the meeting further comprises comparing at least a portion of the located contextual information to a mapping which associates natural language text strings with predetermined attendance classifications until locating a selected one of the predetermined attendance classifications that corresponds to the compared portion; and
   further comprising using the selected one to indicate, in the notification to be sent to each new invitee, whether the new invitee is to be a mandatory participant for the meeting.

13. The method according to claim 1, further comprising:
   providing, in an invitation window for presentation to the meeting host prior to the sending, a representation for each of the entries on the notification list subsequent to the removing and the adding, each representation comprising:
      a name of the invitee to whom the entry corresponds; and
      at least one of: (i) an attendance classification comprising whether the invitee to whom the entry corresponds is to be a mandatory participant or an optional participant; (ii) a current instant messaging status of the invitee to whom the entry corresponds; and (iii) a selection mechanism with which the meeting host can remove the invitee to whom the entry corresponds from the notification list prior to the sending;
   providing, in the invitation window, content to be sent in the notification;
   presenting the invitation window to the meeting host on the user interface of the electronic device prior to the sending; and
   enabling the meeting host to perform, prior to the sending, at least one of: (i) modifying the attendance classification in at least one representation; and (ii) using the selection mechanism in at least one representation to remove the invitee to whom the entry corresponds from the notification list.

14. The method according to claim 13, wherein responsive to the meeting host performing modifying the attendance classification in at least one representation, invoking a learning component that prompts the meeting host to indicate whether a mapping corresponding to the attendance classification presented in the representation prior to the modification is to be changed to use the modified attendance classification, and if so, updating the mapping to use the modified attendance classification.

15. The method according to claim 1, further comprising disambiguating the identification of at least one of the at least one additional person by consulting a historical database that stores information about attendance of a plurality of meeting participants in a plurality of past meetings.

16. The method according to claim 15, wherein the information about the attendance comprises, for each of the plurality of the meeting participants in the past meetings, at least one role of the meeting participant in the past meetings, a last time of attendance of the meeting participant in the past meetings, and a frequency of attendance of the meeting participant in the past meetings.

17. The method according to claim 1, wherein the method is performed responsive to a start of the meeting.

18. A computer-implemented system for gathering participants during an in-progress meeting, comprising:
   a computer comprising a processor; and
   instructions which are executable, using the processor, to implement functions comprising:
      a host of the meeting initializing a notification list for a meeting to contain a corresponding entry for each of a plurality of invitees who were originally invited to the meeting;
      parsing real-time audio of the meeting, until a point in time during the meeting, to determine ones of the invitees who are participating in the meeting;
      removing the corresponding entry for each of the determined ones from the notification list to thereby cause the notification list to represent each of the originally-invited invitees who is not participating in the meeting;
      parsing the real-time audio, until the point in time during the meeting, to determine each of at least one additional person who was not one of the plurality of invitees but who is identified in the audio as a new invitee who is not participating in the meeting;
      adding a corresponding entry to the notification list for each determined new invitee to thereby cause the notification list to represent the each of the originally-invited invitees who is not participating in the meeting and each of the new invitees who is not participating in the meeting;

for each of the entries on the notification list subsequent to the removing and the adding, sending a notification to a communication device of the invitee to whom the entry corresponds, the notification inviting the invitee to join the in-progress meeting;

receiving, from any responding ones of the communication devices of the invitees to whom the notification was sent, a response to the notification;

from each received response, determining a joining status of the invitee from whose communication device the response was received;

consolidating, for presentation to the host of the meeting, a report comprising the joining status determined from the each received response; and presenting the consolidated report to the meeting host on a graphical user interface of an electronic device to provide visual identification of the determined joining status for the each of the originally-invited invitees who is not participating in the meeting and the each of the new invitees who is not participating in the meeting.

19. A computer program product for gathering participants during an in-progress meeting, the computer program product comprising:

a non-transitory computer-readable storage medium having computer readable program code embodied therein, the computer-readable program code configured for:

a host of the meeting initializing a notification list for a meeting to contain a corresponding entry for each of a plurality of invitees who were originally invited to the meeting;

parsing real-time audio of the meeting, until a point in time during the meeting, to determine ones of the invitees who are participating in the meeting;

removing the corresponding entry for each of the determined ones from the notification list to thereby cause the notification list to represent each of the originally-invited invitees who is not participating in the meeting;

parsing the real-time audio, until the point in time during the meeting, to determine each of at least one additional person who was not one of the plurality of invitees but who is identified in the audio as a new invitee who is not participating in the meeting;

adding a corresponding entry to the notification list for each determined new invitee to thereby cause the notification list to represent the each of the originally-invited invitees who is not participating in the meeting and each of the new invitees who is not participating in the meeting;

for each of the entries on the notification list subsequent to the removing and the adding, sending a notification to a communication device of the invitee to whom the entry corresponds, the notification inviting the invitee to join the in-progress meeting;

receiving, from any responding ones of the communication devices of the invitees to whom the notification was sent, a response to the notification;

from each received response, determining a joining status of the invitee from whose communication device the response was received;

consolidating, for presentation to the host of the meeting, a report comprising the joining status determined from the each received response; and presenting the consolidated report to the meeting host on a graphical user interface of an electronic device to provide visual identification of the determined joining status for the each of the originally-invited invitees who is not participating in the meeting and the each of the new invitees who is not participating in the meeting.

\* \* \* \* \*